United States Patent
Philip et al.

(10) Patent No.: US 12,557,556 B2
(45) Date of Patent: Feb. 17, 2026

(54) MAGNETIC TUNNEL JUNCTION DEVICE

(71) Applicant: INTERNATIONAL BUSINESS MACHINES CORPORATION, Armonk, NY (US)

(72) Inventors: Timothy Mathew Philip, Albany, NY (US); Ching-Tzu Chen, Ossining, NY (US); Kevin W. Brew, Niskayuna, NY (US); Jin Ping Han, Yorktown Heights, NY (US); Injo Ok, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 18/046,948

(22) Filed: Oct. 17, 2022

(65) Prior Publication Data

US 2024/0130243 A1 Apr. 18, 2024

(51) Int. Cl.
| | |
|---|---|
| *H10N 50/10* | (2023.01) |
| *H10B 61/00* | (2023.01) |
| *H10N 50/01* | (2023.01) |
| *H10N 50/80* | (2023.01) |

(52) U.S. Cl.
CPC ............. *H10N 50/10* (2023.02); *H10B 61/00* (2023.02); *H10N 50/01* (2023.02); *H10N 50/80* (2023.02)

(58) Field of Classification Search
CPC ....... H10N 50/10; H10B 61/00; G11C 11/161
See application file for complete search history.

(56) References Cited

U.S. PATENT DOCUMENTS

| | | | |
|---|---|---|---|
| 7,480,173 B2 | 1/2009 | Guo | |
| 7,764,538 B2 | 7/2010 | Ito | |
| 8,295,082 B2 | 10/2012 | Chua-Eoan | |
| 8,804,413 B2 | 8/2014 | Li | |
| 9,166,143 B1 * | 10/2015 | Gan | G11C 11/161 |
| 9,218,866 B2 | 12/2015 | Ranjan | |
| 10,236,047 B1 | 3/2019 | Ryan | |

(Continued)

FOREIGN PATENT DOCUMENTS

| | | |
|---|---|---|
| CN | 113193110 A | 7/2021 |
| CN | 113823733 A | 12/2021 |

(Continued)

OTHER PUBLICATIONS

Intellectual Property Office, "Patents Act 1977: Examination Report under Section 18(3)", May 22, 2025, 06 Pages, GB Application No. 2506475.9.

(Continued)

*Primary Examiner* — Marlon T Fletcher
*Assistant Examiner* — Samuel Jonathan Smith
(74) *Attorney, Agent, or Firm* — Yuanmin Cai

(57) ABSTRACT

Embodiments of present invention provide a magnetic tunnel junction (MTJ) structure. The MTJ structure includes a MTJ stack, the MTJ stack including a tunnel barrier layer on a reference layer and a free layer on the tunnel barrier layer, wherein the free layer includes multiple sub free layers, the multiple sub free layers being multiple ferromagnetic strips placed parallel to each other on the tunnel barrier layer, the multiple ferromagnetic strips having respective first ends connected to a first electrode and respective second ends connected to a second electrode. A method of forming the MTJ structure is also provided.

20 Claims, 13 Drawing Sheets

(56) References Cited

U.S. PATENT DOCUMENTS

| | | | |
|---|---|---|---|
| 2011/0103143 A1* | 5/2011 | Ranjan | H10N 50/80 365/171 |
| 2013/0208536 A1 | 8/2013 | Allenspach et al. | |
| 2016/0351238 A1 | 12/2016 | Doyle | |
| 2019/0189915 A1 | 6/2019 | Lin | |
| 2021/0055360 A1 | 2/2021 | Mauri | |
| 2022/0130441 A1 | 4/2022 | Houssameddine | |

FOREIGN PATENT DOCUMENTS

| | | | |
|---|---|---|---|
| CN | 115188881 A * | 10/2022 | G06N 3/063 |
| CN | 120051828 A | 5/2025 | |
| WO | 2024/083036 A1 | 4/2024 | |

OTHER PUBLICATIONS

Notification of Transmittal of the International Search Report and the Written Opinion of the International Searching Authority, or the Declaration, Date of mailing Dec. 22, 2023, Applicant's or agent's file reference F23W4740, International application No. PCT/CN2023/124447, 7 pages.

Hu et al., "STT-MRAM with double magnetic tunnel junctions", 2015 IEEE International Electron Devices Meeting (IEDM), pp. 26.3.1-26.3.4, doi: 10.1109/IEDM.2015.7409772.

Leonard et al., "Shape-Dependent Multi-Weight Magnetic Artificial Synapses for Neuromorphic Computing", arXiv:2111.11516v2 (cond-mat), Submitted on Nov. 22, 2021, 28 pages.

Liu et al., "A domain wall-magnetic tunnel junction artificial synapse with notched geometry for accurate and efficient training of deep neural networks", Applied Physics. Letters, 118, 202405, 2021, Published Online: May 21, 2021, https://doi.org/10.1063/5.0046032, 8 pages.

Tsunoda et al., "Highly Manufacturable Multi-Level Perpendicular MTJ with a Single Top-Pinned Layer and Multiple Barrier/Free Layers", 2013 IEEE International Electron Devices Meeting, 2013, pp. 3.3.1-3.3.4, doi: 10.1109/IEDM.2013.6724551.

Intellectual Property Office, "Patents Act 1977: Examination Report under Section 18(3)", Sep. 2, 2025, 05 Pages, GB Application No. 2506475.9.

* cited by examiner

MAGNETIC TUNNEL JUNCTION DEVICE

BACKGROUND

The present application relates to manufacturing of semiconductor integrated circuits. More particularly, it relates to method of forming a magnetic tunnel junction device and the structure formed thereby.

Magnetic tunnel junction (MTJ) devices with programmable domain-walls have been proposed for applications in many advanced fields such as, for example, in analog artificial intelligence (AI) hardware. Generally, weights for the AI algorithm may be coded into the conductance of the MTJ devices. For example, by moving the location of the programmable domain-wall in the free layer of the MTJ device, the conductance of the MTJ device may be tuned through a continuum of conductive values.

However, in reality, moving the location of the domain-wall is subject to significant variability. Depending upon the size and shape of the free layer, as well as the variability in the external voltage that is applied to the device to adjust or move the domain-wall, the location of the domain-wall may generally follow a statistical distribution with a standard deviation. In instances, it has been observed that the standard deviation of the location of the domain-wall becomes so large that it hinders the ability to accurately program the MTJ device for any meaning usage or application.

SUMMARY

Embodiments of present invention provide a MTJ structure. The MTJ structure includes a MTJ stack, and the MTJ stack includes a tunnel barrier layer on a reference layer and a free layer on the tunnel barrier layer, wherein the free layer includes multiple sub free layers, the multiple sub free layers being multiple ferromagnetic strips placed parallel to each other on the tunnel barrier layer, the multiple ferromagnetic strips having respective first ends connected to a first electrode and respective second ends connected to a second electrode. The use of multiple sub free layers of ferromagnetic strips reduces the statistical variation of an effective domain-wall location of the free layer as the variation is reduced by the increase in the number of sub free layers.

In one embodiment, the multiple ferromagnetic strips are patterned to have notches formed along respective longitudinal directions of the multiple ferromagnetic strips. In a further embodiment, the notches of the multiple ferromagnetic strips are aligned substantially with each other along the respective longitudinal directions. During operation of the MTJ structure, the notches increase the likelihood or certainty of domain-wall locations by creating discrete locations where the domain-wall location is more likely to settle or sit.

In one embodiment, each of the multiple ferromagnetic strips is covered by a spin-orbit coupling layer, the spin-orbit coupling layer being patterned to have a same shape as that of the ferromagnetic strip covered thereby. By the use of this spin-orbit coupling layer, the threshold current for driving the movement of the domain-wall location is significantly reduced.

In another embodiment, the reference layer is a ferromagnetic layer vertically overlapping with the multiple sub free layers via the tunnel barrier layer.

In one embodiment, the MTJ structure further includes a third electrode, the third electrode being in contact with the reference layer at a substantial central position of the reference layer.

In another embodiment, the multiple sub free layers have respective domain-wall locations, defined by an applied voltage, with each domain-wall location corresponding to a conductance value of G with a standard deviation of S1, and the free layer has an effective domain-wall location, defined by the applied voltage, corresponding to a conductance value of G*N with a standard deviation of S2=S1*sqrt(N), wherein N is the total number of sub free layers. As is clear, the greater number of sub free layers is used, the smaller the standard deviation over conductance becomes.

Embodiments of present invention provide a method of forming a MTJ structure. The method includes forming a blanket tunnel barrier layer on top of a blanket reference layer; forming a blanket free layer on top of the blanket tunnel barrier layer; patterning the blanket free layer into a free layer that has multiple sub free layers, the multiple sub free layers being multiple ferromagnetic strips placed parallel to each other on top of the blanket tunnel barrier layer; and forming a first electrode in contact with respective first ends of the multiple ferromagnetic strips and a second electrode in contact with respective second ends of the multiple ferromagnetic strips.

In one embodiment, patterning the blanket free layer includes forming the multiple ferromagnetic strips with notches along respective longitudinal directions of the multiple ferromagnetic strips. In a further embodiment, the notches of the multiple ferromagnetic strips are substantially aligned with each other along the respective longitudinal directions.

In another embodiment, the method further includes forming a blanket spin-orbit coupling layer on top of the blanket free layer, and patterning the blanket free layer further includes patterning the blanket spin-orbit coupling layer into multiple spin-orbit coupling strips on top of the multiple ferromagnetic strips.

In one embodiment, the method further includes, after patterning the blanket free layer, patterning the blanket tunnel barrier layer and the blanket reference layer into a tunnel barrier layer and a reference layer respectively.

In another embodiment, the method further includes depositing a dielectric layer to cover the multiple sub free layers, the tunnel barrier layer, and the reference layer.

In yet another embodiment, the method further includes forming the blanket reference layer on top of a conductive via, the conductive via being embedded in a dielectric layer and serving as a third electrode to the MTJ structure.

Embodiments of present invention provide yet another method of forming a MTJ structure. The method includes forming a blanket spin-orbit coupling layer on top of a substrate; forming a blanket free layer on top of the blanket spin-orbit coupling layer; patterning the blanket free layer into a free layer, the free layer including multiple sub free layers placed parallel to each other and on top of the blanket spin-orbit coupling layer; depositing a blanket tunnel barrier layer on top of the multiple sub free layers; depositing a blanket reference layer on top of the blanket tunnel barrier layer; patterning the blanket tunnel barrier layer and the blanket reference layer into a tunnel barrier layer and a reference layer respectively, the patterning exposes a first end and a second end of the multiple sub free layers; and forming a first electrode in contact with the first end of the multiple sub free layers, and a second electrode in contact with the second end of the multiple sub free layers.

In one embodiment, the method further includes, after patterning the blanket reference layer and the blanket tunnel barrier layer into the tunnel barrier layer and the reference layer, depositing a dielectric layer covering the reference layer, the tunnel barrier layer, and the multiple sub free layers.

In another embodiment, the method further includes patterning the dielectric layer to create a first and second openings that expose the first end and the second end of the multiple sub free layers before forming the first and second electrodes in the first and second openings.

In yet another embodiment, the method further includes patterning the dielectric layer to create a third opening that exposes a portion of the reference layer between the first and second openings, and subsequently depositing a conductive material in the third opening to form a third electrode.

BRIEF DESCRIPTION OF THE DRAWINGS

The present invention will be understood and appreciated more fully from the following detailed description of embodiments of present invention, taken in conjunction with accompanying drawings of which:

FIGS. 1A, 1B to FIGS. 5A, 5B are demonstrative illustrations of cross-sectional views and top views of a MTJ structure in a process of manufacturing thereof according to one embodiment of present invention;

FIGS. 6A, 6B to FIGS. 10A, 10B are demonstrative illustrations of cross-sectional views and top views of a MTJ structure in a process of manufacturing thereof according to another embodiment of present invention;

Figure 1A:
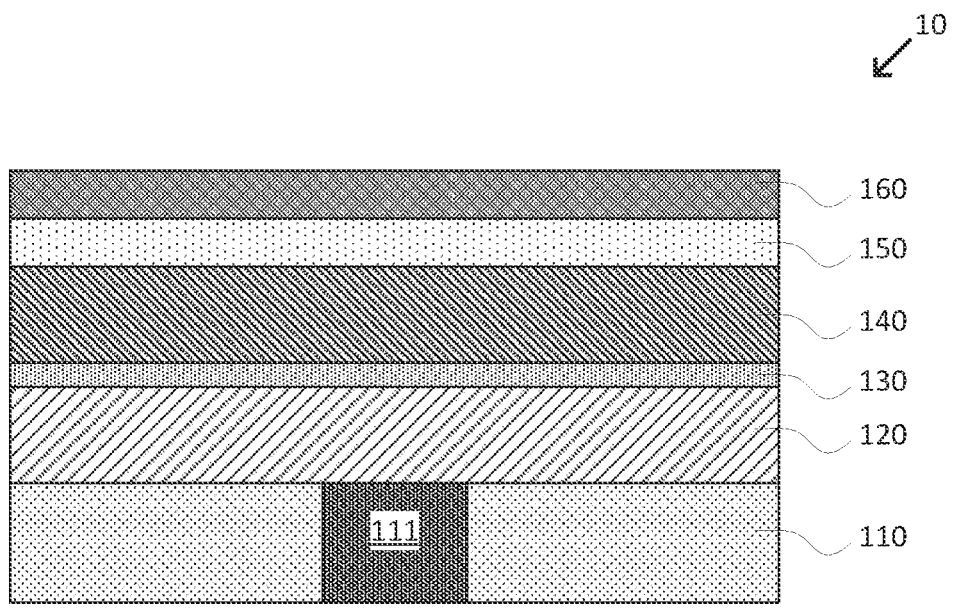

It will be appreciated that for simplicity and clarity purpose, elements shown in the drawings have not necessarily been drawn to scale. Further, and if applicable, in various functional block diagrams, two connected devices and/or elements may not necessarily be illustrated as being connected. In some other instances, grouping of certain elements in a functional block diagram may be solely for the purpose of description and may not necessarily imply that they are in a single physical entity, or they are embodied in a single physical entity.

DETAILED DESCRIPTION

In the below detailed description and the accompanying drawings, it is to be understood that various layers, structures, and regions shown in the drawings are both demonstrative and schematic illustrations thereof that are not drawn to scale. In addition, for the ease of explanation, one or more layers, structures, and regions of a type commonly used to form semiconductor devices or structures may not be explicitly shown in a given illustration or drawing. This does not imply that any layers, structures, and regions not explicitly shown are omitted from the actual semiconductor structures. Furthermore, it is to be understood that the embodiments discussed herein are not limited to the particular materials, features, and processing steps shown and described herein. In particular, with respect to semiconductor processing steps, it is to be emphasized that the descriptions provided herein are not intended to encompass all of the processing steps that may be required to form a functional semiconductor integrated circuit device. Rather, certain processing steps that are commonly used in forming semiconductor devices, such as, for example, wet cleaning and annealing steps, are purposefully not described herein for economy of description.

It is to be understood that the terms "about" or "substantially" as used herein with regard to thicknesses, widths, percentages, ranges, etc., are meant to denote being close or approximate to, but not exactly. For example, the term "about" or "substantially" as used herein implies that a small margin of error may be present such as, by way of example only, 1% or less than the stated amount. Likewise, the terms "on", "over", or "on top of" that are used herein to describe a positional relationship between two layers or structures are intended to be broadly construed and should not be interpreted as precluding the presence of one or more intervening layers or structures.

To provide spatial context to different structural orientations of the semiconductor structures shown in the drawings, XYZ Cartesian coordinates may be provided in some of the drawings. The terms "vertical" or "vertical direction" or "vertical height" as used herein denote a Z-direction of the Cartesian coordinates shown in the drawings, and the terms "horizontal" or "horizontal direction" or "lateral direction" as used herein denote an X-direction and/or a Y-direction of the Cartesian coordinates shown in the drawings.

Moreover, although various reference numerals may be used across different drawings, the same or similar reference numbers are used throughout the drawings to denote the same or similar features, elements, or structures, and thus detailed explanations of the same or similar features, elements, or structures may not be repeated for each of the drawings for economy of description. Labelling for the same or similar elements in some drawings may be omitted as well in order not to overcrowd the drawings.

Figure 1B:
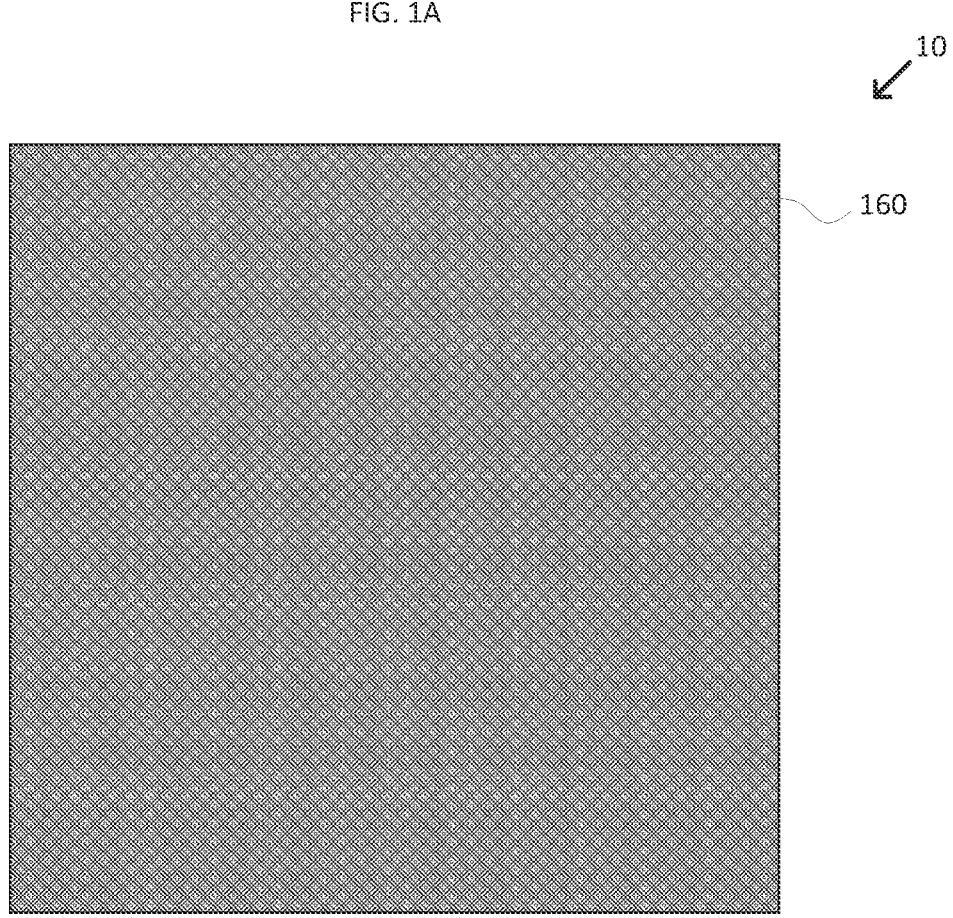

FIGS. 1A and 1B are demonstrative illustrations of cross-sectional view (A) and top view (B) of a MTJ structure in a step of manufacturing thereof according to one embodiment of present invention. More particularly, in forming a MTJ structure 10, embodiments of present invention provide forming a conductive via 111 in a supporting structure such as a dielectric layer 110 or, alternatively, receiving a dielectric layer 110 with a conductive via 111 already formed therewithin. In one embodiment, the dielectric layer 110 may be part of a substrate such as a semiconductor substrate. On the other hand, the conductive via 111 may be made of, for example, tantalum-nitride (TaN), titanium-nitride (TiN), copper (Cu), tungsten (W), or other suitable conductive materials and may serve as an electrode (such as a third electrode) of the MTJ structure 10, the manufacturing of which is described below in more details.

Furthermore, embodiments of present invention provide forming a blanket reference layer 120 over the conductive via 111 and the dielectric layer 110, a blanket tunnel barrier layer 130 over the blanket reference layer 120, a blanket free layer 140 over the blanket tunnel barrier layer 130, and a blanket spin-orbit coupling layer 150 over the blanket free layer 140.

In one embodiment, the blanket reference layer 120 and blanket free layer 140 may be blanket ferromagnetic layers. Each blanket ferromagnetic layer may be independently a layer of cobalt (Co), iron (Fe), and boron (B) based material (CoFeB) such as, for example, an alloy of Co, Fe, and B although other types of ferromagnetic material such as an alloy of Co and Fe (CoFe) or an alloy of nickel (Ni) and Fe (NiFe) may be used as well. In some embodiment the blanket reference layer may include a combination of a ferromagnetic layer and a Co-based synthetic anti-ferromagnetic layer. The blanket reference layer and the blanket free layer may be formed to have a thickness that individually ranges from about 0.5 nm to about 30 nm.

In one embodiment, the blank tunnel barrier layer 130 may be a layer of magnesium oxide (MgO) or other suitable materials including, for example, aluminum oxide ($Al_2O_3$) or titanium oxide ($TiO_2$) and may be formed to have a thickness typically ranging from about 0.5 nm to about 1.5 nm although other thicknesses are possible as well.

In one embodiment, the blanket spin-orbit coupling layer 150 may be a layer of spin-orbit torque material that may include, for example, tantalum (Ta), platinum (Pt), or other suitable materials. The blanket spin-orbit coupling layer 150 may be formed to have a thickness typically ranging from about 0.5 nm to about 5 nm.

Embodiments of present invention may further provide forming a hard mask layer 160 on top of the spin-orbit coupling layer 150. The hard mask layer 160 may subsequently be patterned to form an etch mask and may be used in a subsequent step in patterning the blanket free layer 140, as being described below in more details.

Figure 2A:
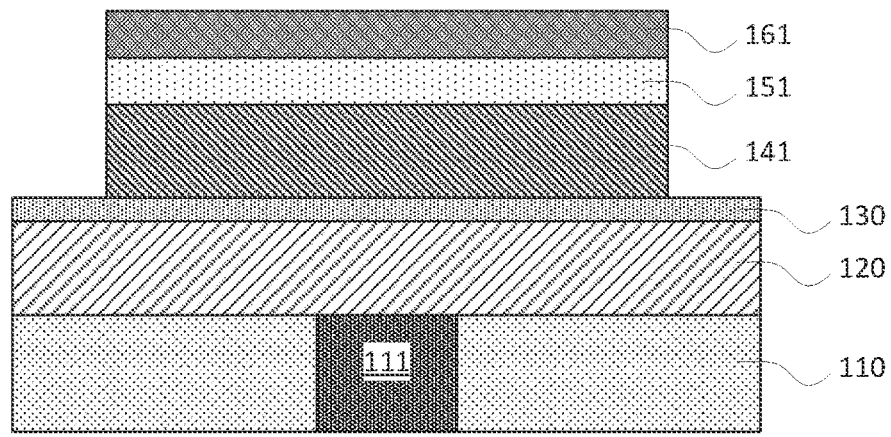
Figure 2B:
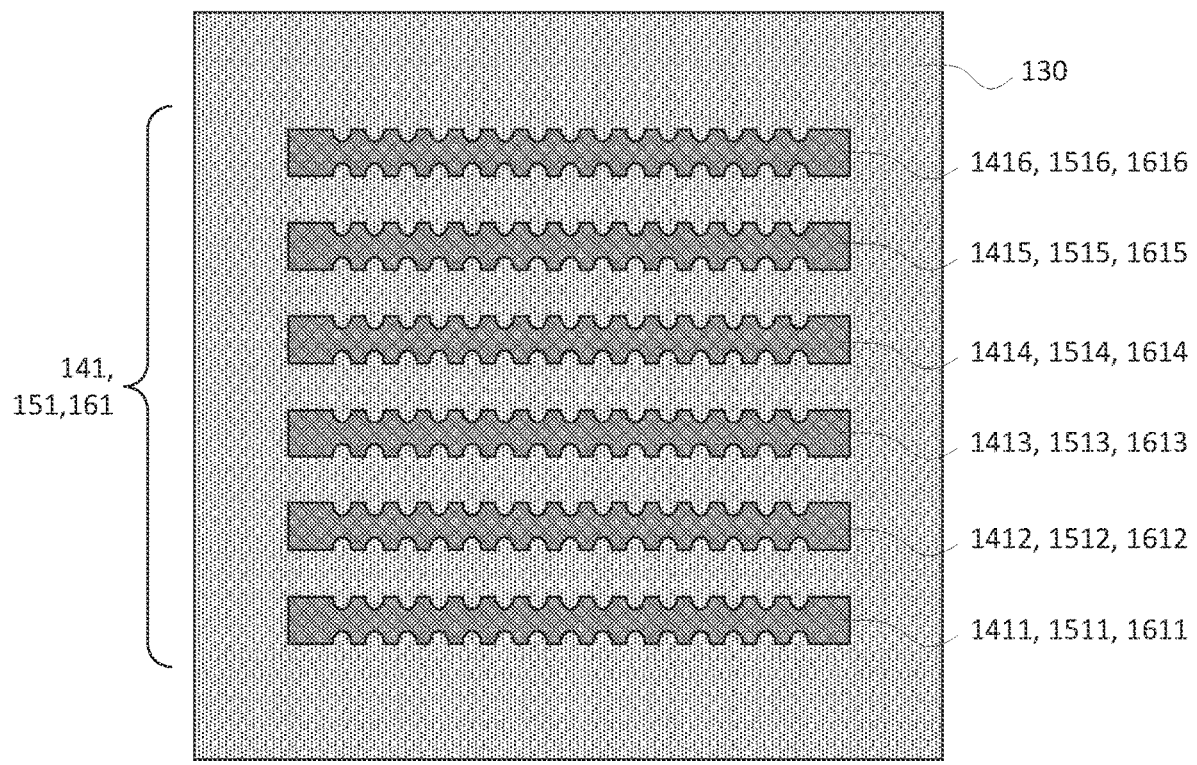

FIGS. 2A and 2B are demonstrative illustrations of cross-sectional view (A) and top view (B) of a MTJ structure in a step of manufacturing thereof, following the step illustrated in FIGS. 1A and 1B, according to one embodiment of present invention. More particularly, embodiments of present invention provide patterning the hard mask layer 160 into a hard mask 161 that includes multiple hard mask strips such as, for example, hard mask strips 1611, 1612, 1613, 1614, 1615, and 1616 that are parallel to each other. Although six (6) hard mask strips are demonstratively illustrated in FIG. 2B, more or less number of hard mask strips may be possible and are fully contemplated by the embodiment of present invention. In a further embodiment, the multiple hard mask strips 1611, 1612, 1613, 1614, 1615, and 1616 may preferably, and optionally, have a plurality of notches that are formed continuously along respective longitudinal directions thereof. The notches may be uniform or non-uniform along the longitudinal directions of each strip although uniform notches are generally more preferable. The hard mask 161 may be made of silicon nitride (SiN) or other suitable materials.

Embodiments of present invention may further provide transferring the pattern of the hard mask 161 onto the underneath blanket spin-orbit coupling layer 150 and the blanket free layer 140 through, for example, an anisotropic etching process. The anisotropic etching process may stop at the blanket tunnel barrier layer 130. The transferring of pattern of the hard mask 161 thereby forms a free layer 141 that includes multiple sub free layers 1411, 1412, 1413, 1414, 1415, and 1416 that are parallel to each other. Since the blanket free layer 140 is a layer of ferromagnetic material, the multiple sub free layers 1411, 1412, 1413, 1414, 1415, and 1416 may be multiple ferromagnetic strips. The multiple sub free layers 1411, 1412, 1413, 1414, 1415, and 1416 may each have a plurality of notches formed along their respective longitudinal directions. The creation of notches along the sub free layers help create discrete (or digitized) conductance/resistance values of the MTJ structure or device and, during operation of the device, the greater the number of notches the higher the resolution of conductance/resistance of the MTJ device may provide.

In one embodiment, notches of the multiple sub free layers may be substantially aligned with each other along their longitudinal directions. The notches may have a uniform pitch and the pitch may be the same among the multiple sub free layers. However, embodiments of present invention are not limited in this aspect. For example, notches of the multiple sub free layers may not necessarily have a same pitch and/or may not be vertically aligned with each other. However, by increasing the pitch and/or aligning the notches it may help increase resolution of the conductance/resistance during the MTJ device operation and/or increase the uniformity of the resolution.

Similarly, the transferring of the pattern of the hard mask 161 may also form a spin-orbit coupling layer 151 that includes multiple spin-orbit coupling strips 1511, 1512, 1513, 1514, 1515, and 1516 that are parallel with each other. By virtue of the transferring process being an anisotropic etching process, the hard mask 161, the spin-orbit coupling layer 151, and the free layer 141 have substantially the same shape. The hard mask 161 is demonstratively illustrated in a top view in FIG. 2B with the spin-orbit coupling layer 151 and the free layer 141 being underneath and covered by the hard mask 161.

Figure 3A:
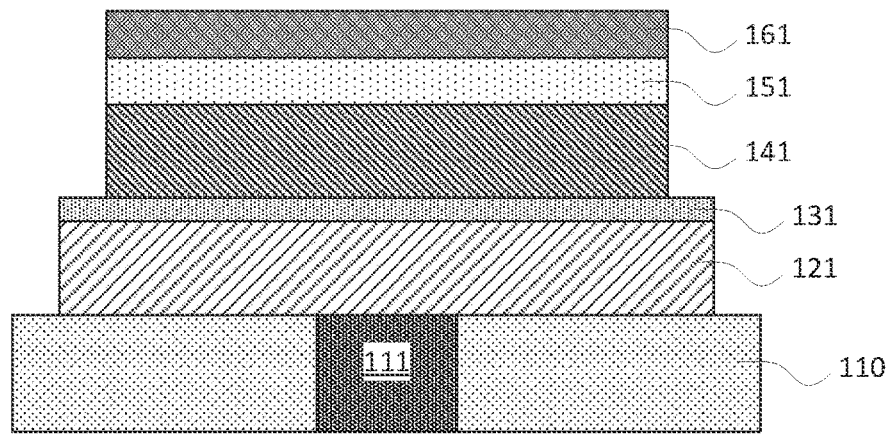
Figure 3B:
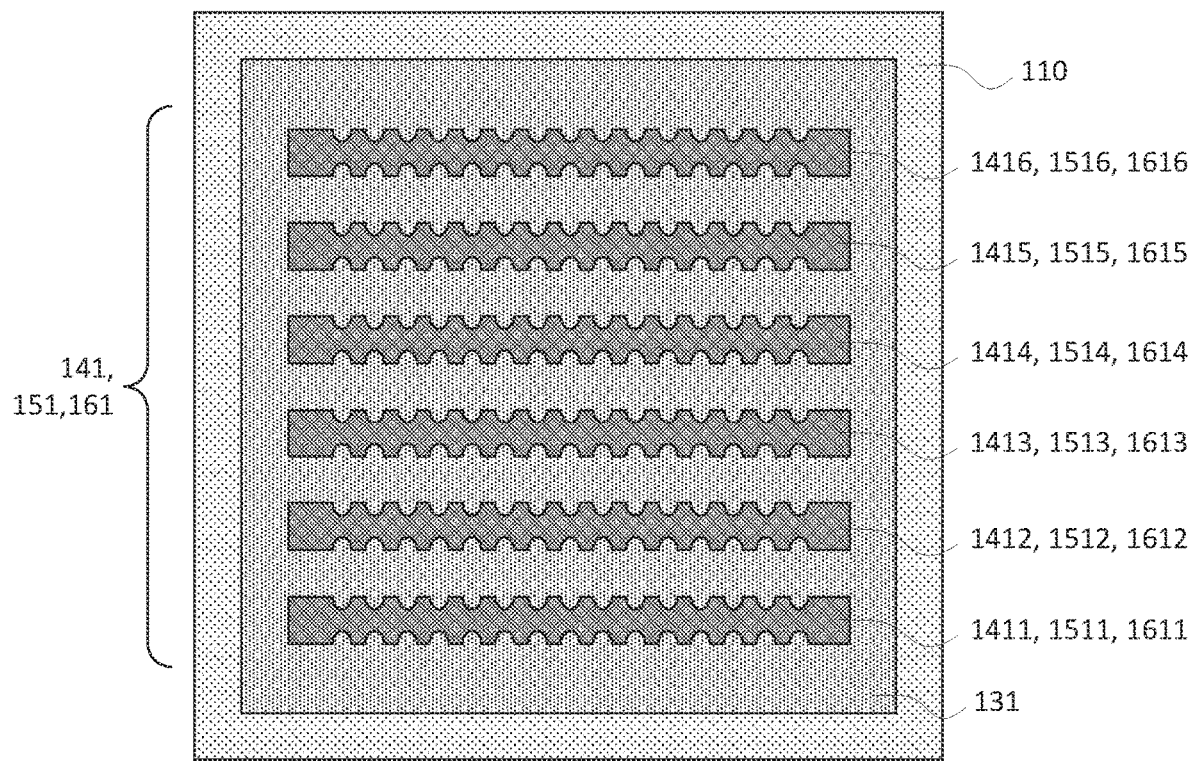

FIGS. 3A and 3B are demonstrative illustrations of a cross-sectional view (A) and a top view (B) of a MTJ structure in a step of manufacturing thereof, following the step illustrated in FIGS. 2A and 2B, according to one embodiment of present invention. More particularly, embodiments of present invention provide patterning the blanket tunnel barrier layer 130 and the blanket reference layer 120 into a tunnel barrier layer 131 and a reference layer 121. For example, embodiments of present invention provide forming an organic planarization layer (OPL) on top of the MTJ structure 10 under manufacturing and forming an etch mask on top of the OPL. Subsequently, embodiments of present invention provide using the etch mask in an anisotropic etching process to etch the OPL and the underneath blanket tunnel barrier layer 130 and blanket reference layer 120, thereby creating or forming the tunnel barrier layer 131 and the reference layer 121. Since blanket reference layer 120 is a layer of ferromagnetic material, the reference layer 121 formed therefrom is a ferromagnetic layer as well. In one embodiment, the etching of the blanket reference layer 120 may place the conductive via 111 at a substantially central portion of the reference layer 121 formed thereby. The conductive via 111 may form, or function as, a third electrode of the MTJ structure under manufacturing, as being described below in more details, and may also be referred to as a third electrode 111.

Figure 4A:
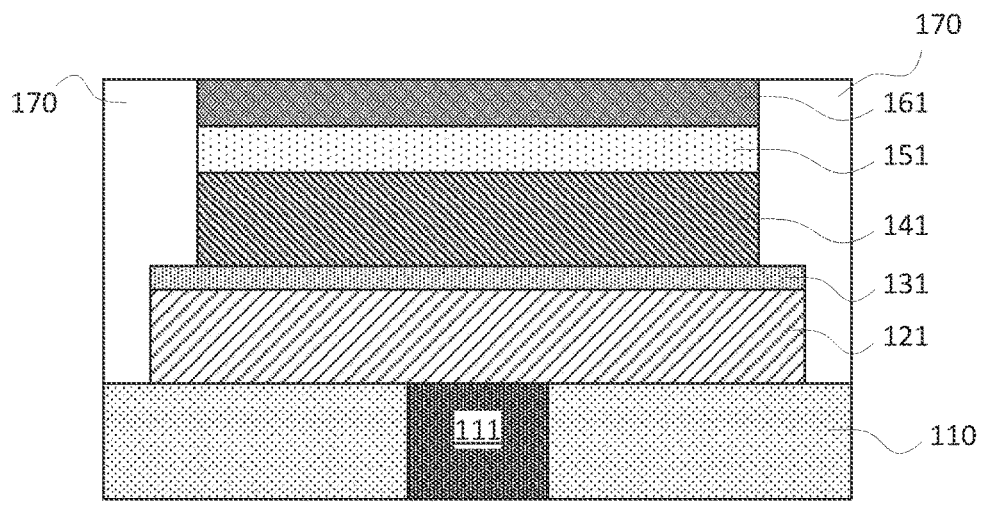
Figure 4B:
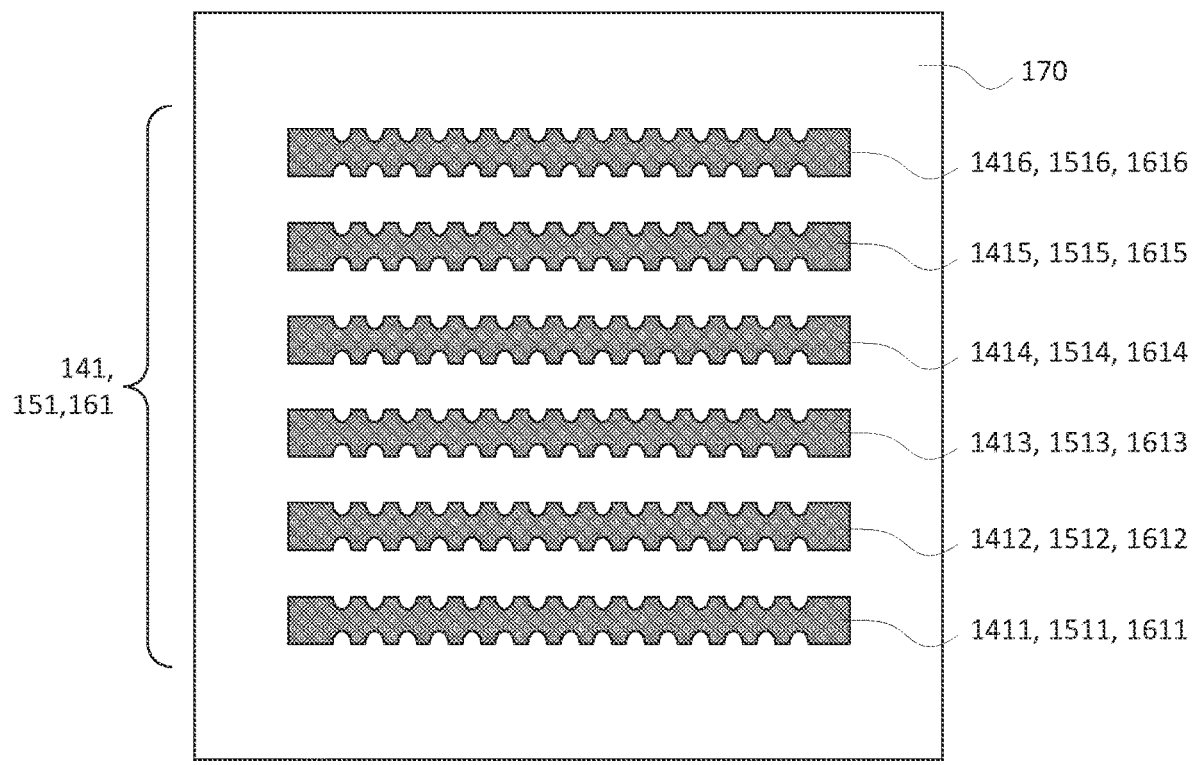

FIGS. 4A and 4B are demonstrative illustrations of a cross-sectional view (A) and a top view (B) of a MTJ structure in a step of manufacturing thereof, following the step illustrated in FIGS. 3A and 3B, according to one embodiment of present invention. More particularly, embodiments of present invention provide depositing a dielectric layer 170 to encapsulate the MTJ structure 10 under manufacturing. For example, embodiments of present invention provide forming the dielectric layer 170 to cover sidewalls and/or side surfaces of the hard mask 161, the spin-orbit coupling layer 151, the free layer 141, the tunnel barrier layer 131, and the reference layer 121. The dielectric layer 170 may cover top surface of the exposed dielectric layer 110 as well. The dielectric layer 170 may be formed to have a top surface that is coplanar with the top surface of the hard mask 161. For example, the dielectric layer 170 may initially be deposited to be above and cover the hard mask 161. Subsequently, the dielectric layer 170 may be planarized through a chemical-mechanic-polishing (CMP) process to have a top surface that is coplanar with the top surface of the hard mask 161.

Figure 5A:
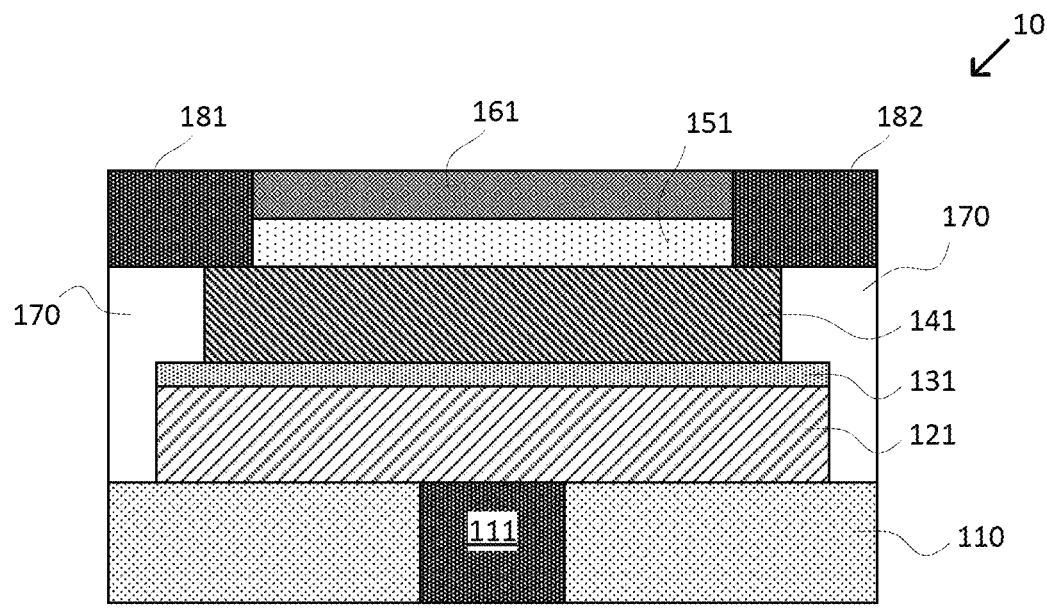
Figure 5B:
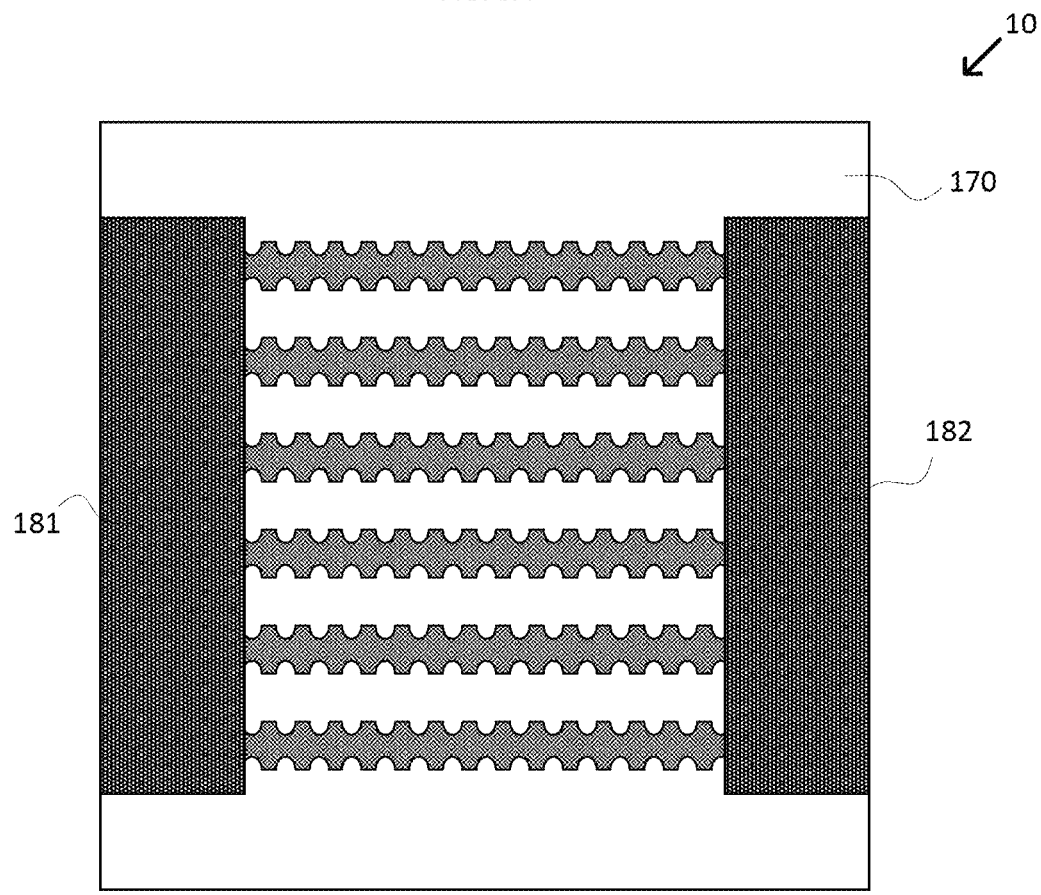

FIGS. 5A and 5B are demonstrative illustrations of a cross-sectional view (A) and a top view (B) of a MTJ structure in a step of manufacturing thereof, following the step illustrated in FIGS. 4A and 4B, according to one embodiment of present invention. More particularly, embodiments of present invention provide forming a first electrode 181 in contact with a first end, for example the left-side end as in FIG. 5A and FIG. 5B, of the free layer 141. The first end of the free layer 141 may include respective first ends of the multiple sub free layers 1411, 1412, 1413, 1414, 1415, and 1416. Embodiments of present invention also provide forming a second electrode 182 in contact with a second end, for example the right-side end as in FIG. 5A and FIG. 5B, of the free layer 141. The second end of the free layer 141 may include respective second ends of the multiple sub free layers 1411, 1412, 1413, 1414, 1415, and 1416.

In one embodiment, the first and second electrodes 181 and 182 may be formed through a selective metal growing process such as, for example, an atomic-layer-deposition (ALD) process, a chemical-vapor-deposition (CVD) process or a physical-vapor-deposition (PVD) process, and may be made of, for example, tantalum-nitride (TaN), titanium-nitride (TiN), copper (Cu), tungsten (W), or other suitable conductive materials. In another embodiment, the first and second electrodes 181 and 182 may only need to be formed to be in contact with first and second ends of the spin-orbit coupling layer 151 since the spin-orbit coupling layer 151 is in direct contact with the underneath free layer 141.

Figure 6A:
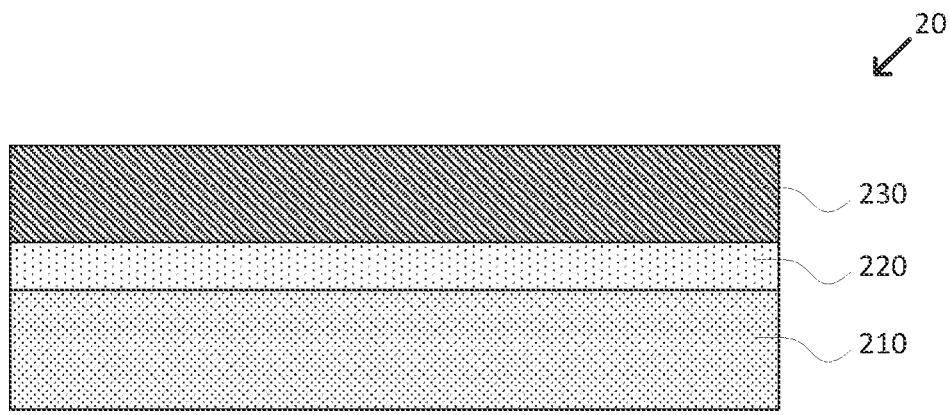
Figure 6B:
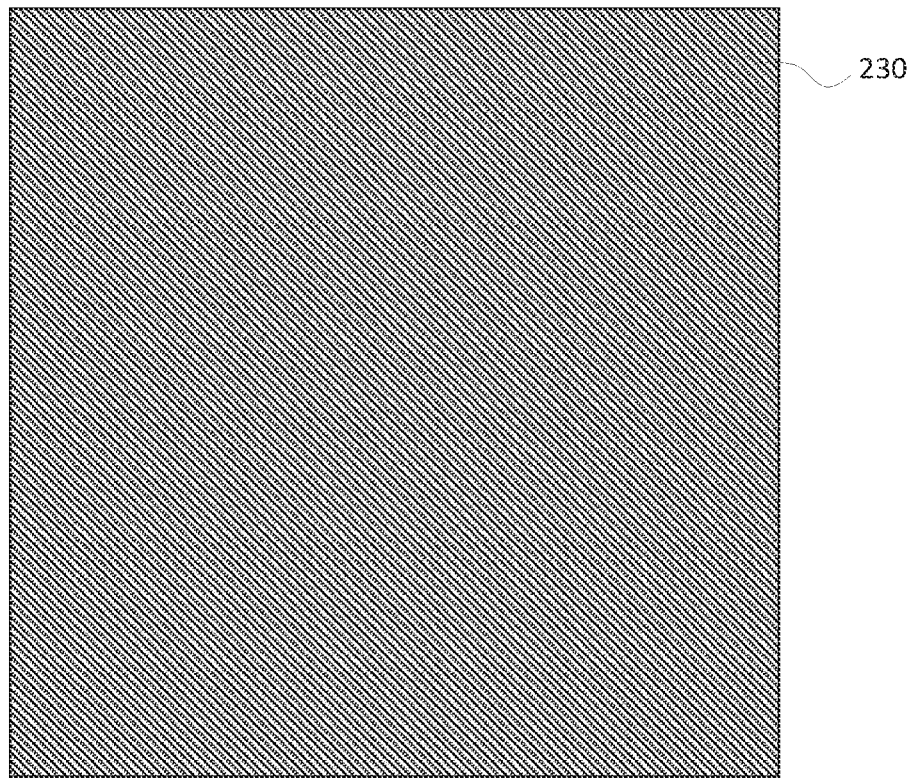

FIGS. 6A and 6B are demonstrative illustrations of cross-sectional view (A) and top view (B) of another MTJ structure in a step of manufacturing thereof according to one embodiment of present invention. More particularly, in forming a MTJ structure 20, embodiments of present invention provide receiving a dielectric layer 210, which may be part of a substrate such as a semiconductor substrate; forming a blanket spin-orbit coupling layer 220 over the dielectric layer 210; and forming a blanket free layer 230 over the blanket spin-orbit coupling layer 220.

In one embodiment, the blanket spin-orbit coupling layer 220 may be a layer of spin-orbit torque material that may include, for example, tantalum (Ta), platinum (Pt), or other suitable materials. The blanket spin-orbit coupling layer 220 may be formed to have a thickness ranging from about 0.5 nm to about 5 nm although other thicknesses are possible and are fully contemplated.

In another embodiment, the blanket free layer 230 may be a blanket ferromagnetic layer, and the blanket ferromagnetic layer may be a layer of Co, Fe, and B based material (CoFeB) such as, for example, an alloy of Co, Fe, and B although other types of ferromagnetic material such as an alloy of Co and Fe (CoFe) or an alloy of Ni and Fe (NiFe) may be used as well. The blanket ferromagnetic layer may be formed to have a thickness ranging from about 0.5 nm to about 30 nm, although other thicknesses are possible and are fully contemplated here as well.

Figure 7A:
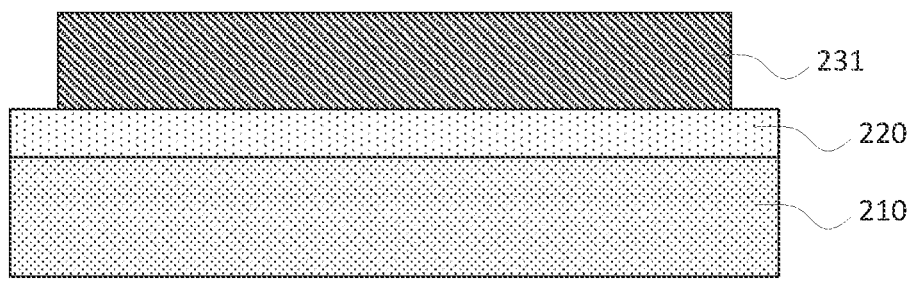
Figure 7B:
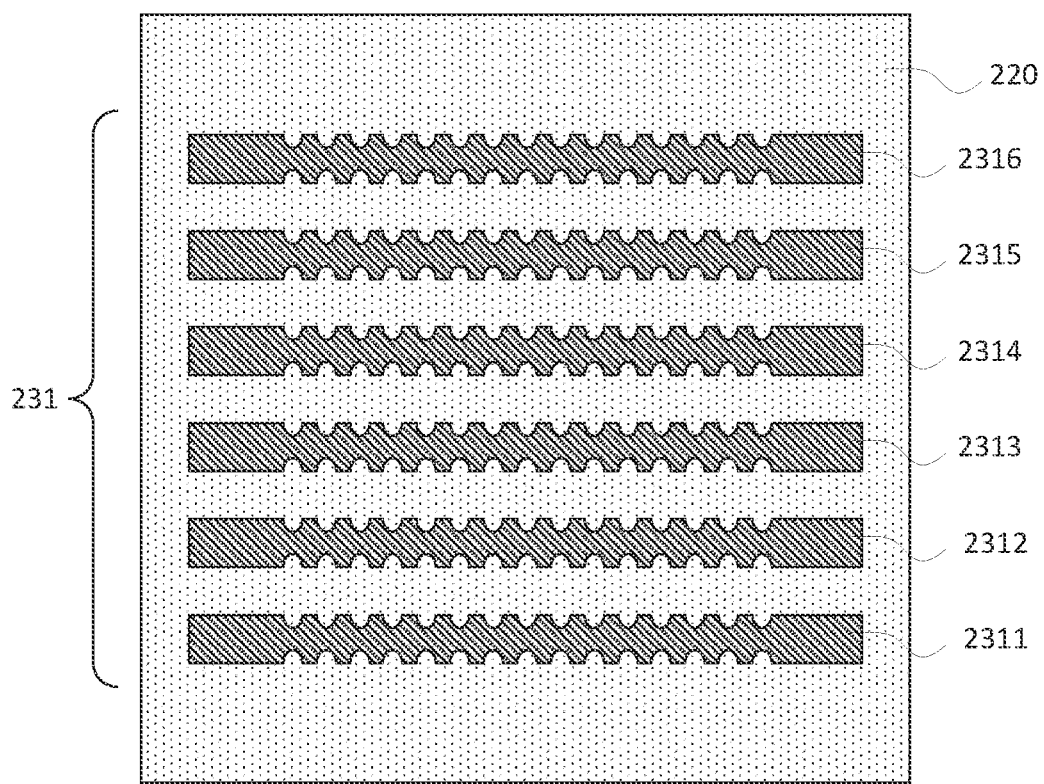

FIGS. 7A and 7B are demonstrative illustrations of cross-sectional view (A) and top view (B) of a MTJ structure in a step of manufacturing thereof, following the step illustrated in FIGS. 6A and 6B, according to one embodiment of present invention. More particularly, embodiments of present invention provide patterning the blanket free layer 230 into a free layer 231 that includes multiple sub free layers such as, for example, sub free layer 2311, 2312, 2313, 2314, 2315, and 2316 that are parallel to each other. Here, six (6) sub free layers are illustrated in FIG. 7B merely as an example, and more or less number of sub free layers are possible and are fully contemplated by the embodiment of present invention.

In a further embodiment, the multiple sub free layers 2311, 2312, 2313, 2314, 2315, and 2316 may, optionally, be formed to have a plurality of notches formed continuously along their respective longitudinal directions. The patterning of the blanket free layer 230 may be made by, for example, forming a hard mask on top of the blanket free layer 230 through a lithographic patterning process, and subsequently transferring the pattern of the hard mask onto the blanket free layer 230 through an anisotropic etching process. The hard mask may subsequently be removed after the anisotropic etching process.

Figure 8A:
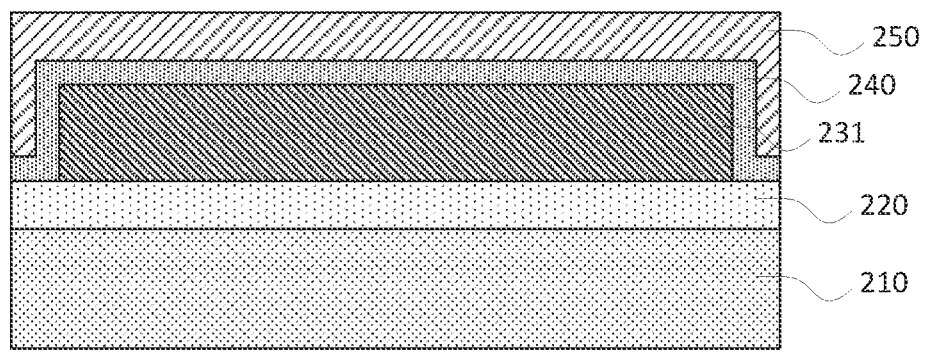
Figure 8B:
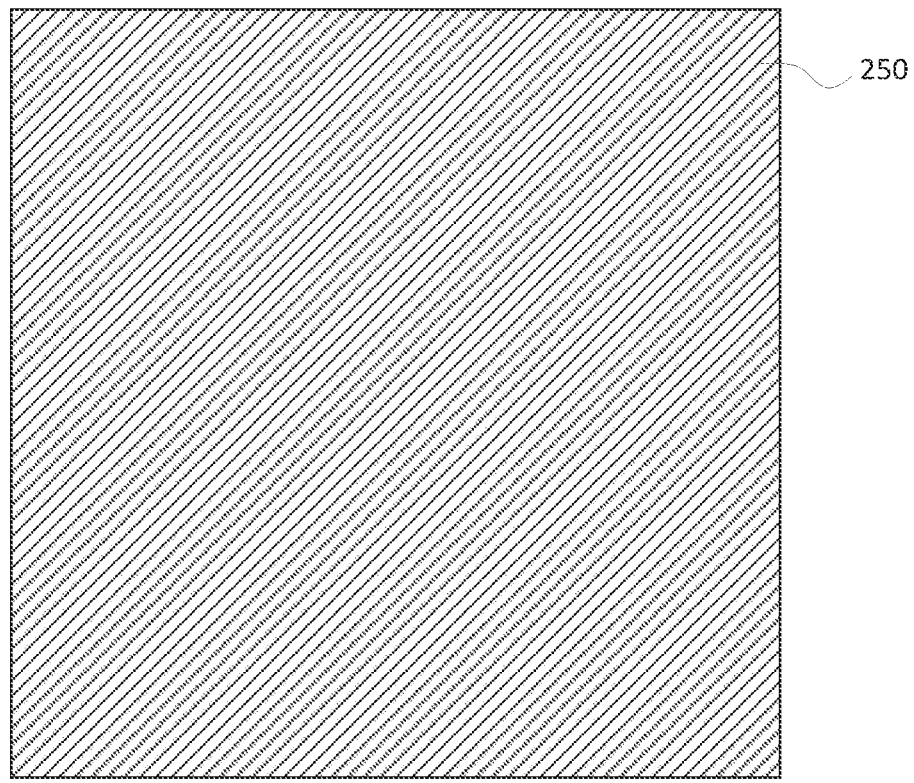

FIGS. 8A and 8B are demonstrative illustrations of a cross-sectional view (A) and a top view (B) of a MTJ structure in a step of manufacturing thereof, following the step illustrated in FIGS. 7A and 7B, according to one embodiment of present invention. More particularly, embodiments of present invention provide forming a blanket tunnel barrier layer 240 over the free layer 231 that includes the multiple sub free layers 2311, 2312, 2313, 2314, 2315, and 2316 and forming a blanket reference layer 250 over the blanket tunnel barrier layer 240. The blanket tunnel barrier layer 240 and the blanket reference layer 250 may cover the sidewalls or side surfaces of the free layer 231.

In one embodiment, the blank tunnel barrier layer 240 may be a layer of magnesium oxide (MgO) or other suitable materials including, for example, aluminum oxide ($Al_2O_3$) or titanium oxide ($TiO_2$) and may be formed to have a thickness ranging from about 0.5 nm to about 1.5 nm, although other thicknesses are possible as well. In another embodiment, the blanket reference layer 250 may be a blanket ferromagnetic layer, and the blanket ferromagnetic layer may be a layer of Co, Fe, and B based material (CoFeB) such as, for example, an alloy of Co, Fe, and B although other types of ferromagnetic material such as an alloy of Co and Fe (CoFe) or an alloy of Ni and Fe (NiFe) may be used as well. The blanket ferromagnetic layer may be formed to have a thickness ranging, for example, from about 0.5 nm to about 30 nm.

Figure 9A:
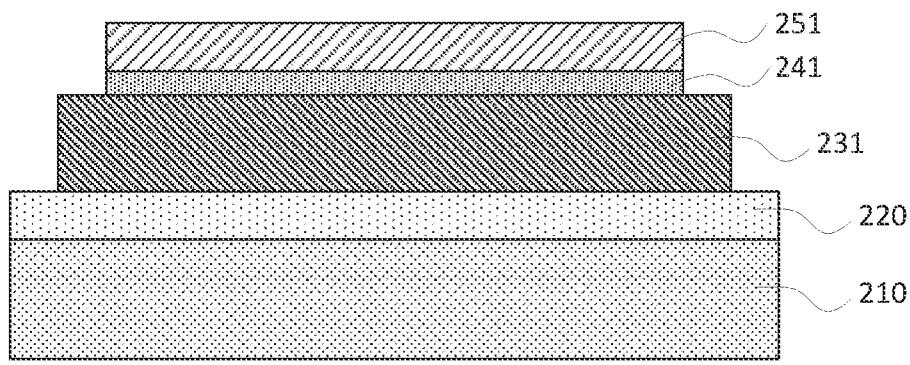
Figure 9B:
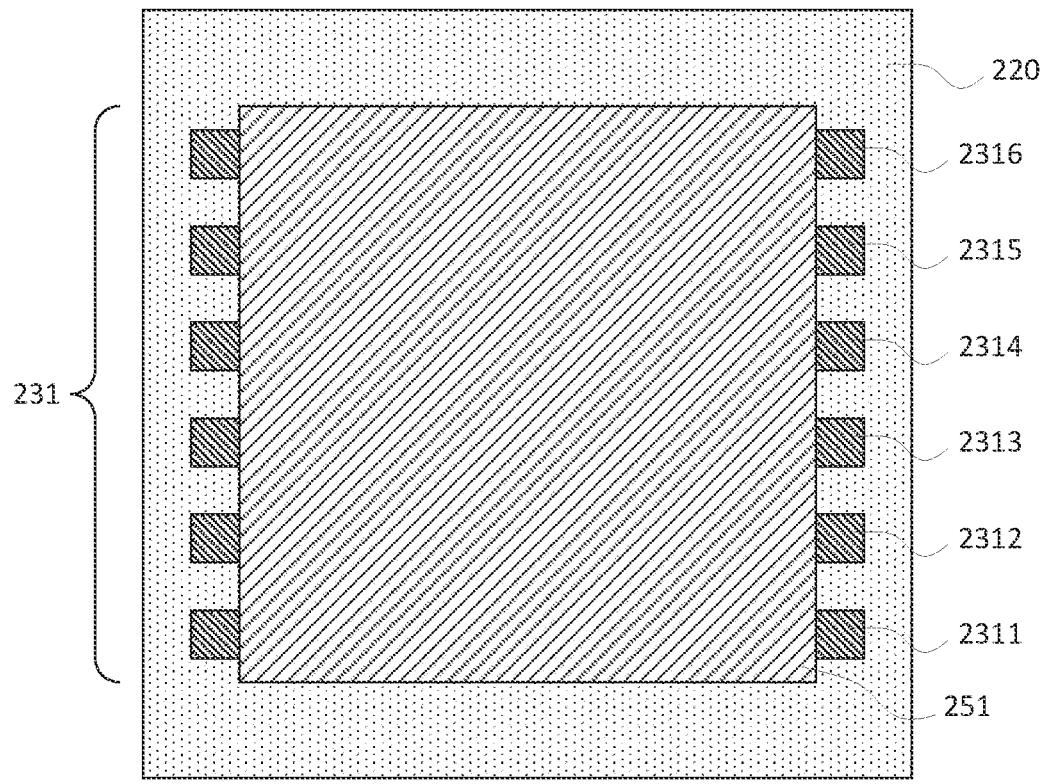

FIGS. 9A and 9B are demonstrative illustrations of a cross-sectional view (A) and a top view (B) of a MTJ structure in a step of manufacturing thereof, following the step illustrated in FIGS. 8A and 8B, according to one embodiment of present invention. More particularly, embodiments of present invention provide patterning the blanket reference layer 250 and the blanket tunnel barrier layer 240 into a reference layer 251 and a tunnel barrier layer 241. For example, embodiments of present invention provide forming a hard mask on top of the blanket reference layer 250 and subsequently transferring the pattern of the hard mask onto the blanket reference layer 250 and underneath blanket tunnel barrier layer 240, thereby forming the reference layer 251 and the tunnel barrier layer 241. The transferring process of the pattern of the hard mask may be an anisotropic and selective etching process which may stop at the free layer 231 and the blanket spin-orbit coupling layer 220.

In one embodiment, patterning the blanket reference layer 250 and the blanket tunnel barrier layer 240 exposes a first end or left-side end (as in FIG. 9A and FIG. 9B) of the free layer 231 or respective first ends of the multiple sub free layers 2311, 2312, 2313, 2314, 2315, and 2316. The patterning process also exposes a second end or right-side end (as in FIG. 9A and FIG. 9B) of the free layer 231 or respective second ends of the multiple sub free layers 2311, 2312, 2313, 2314, 2315, and 2316.

Figure 10A:
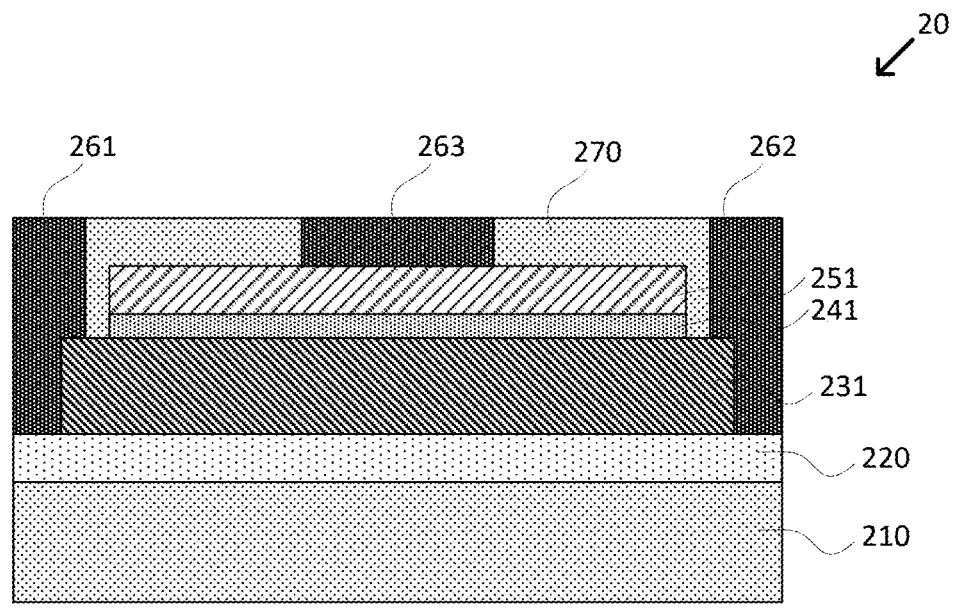
Figure 10B:
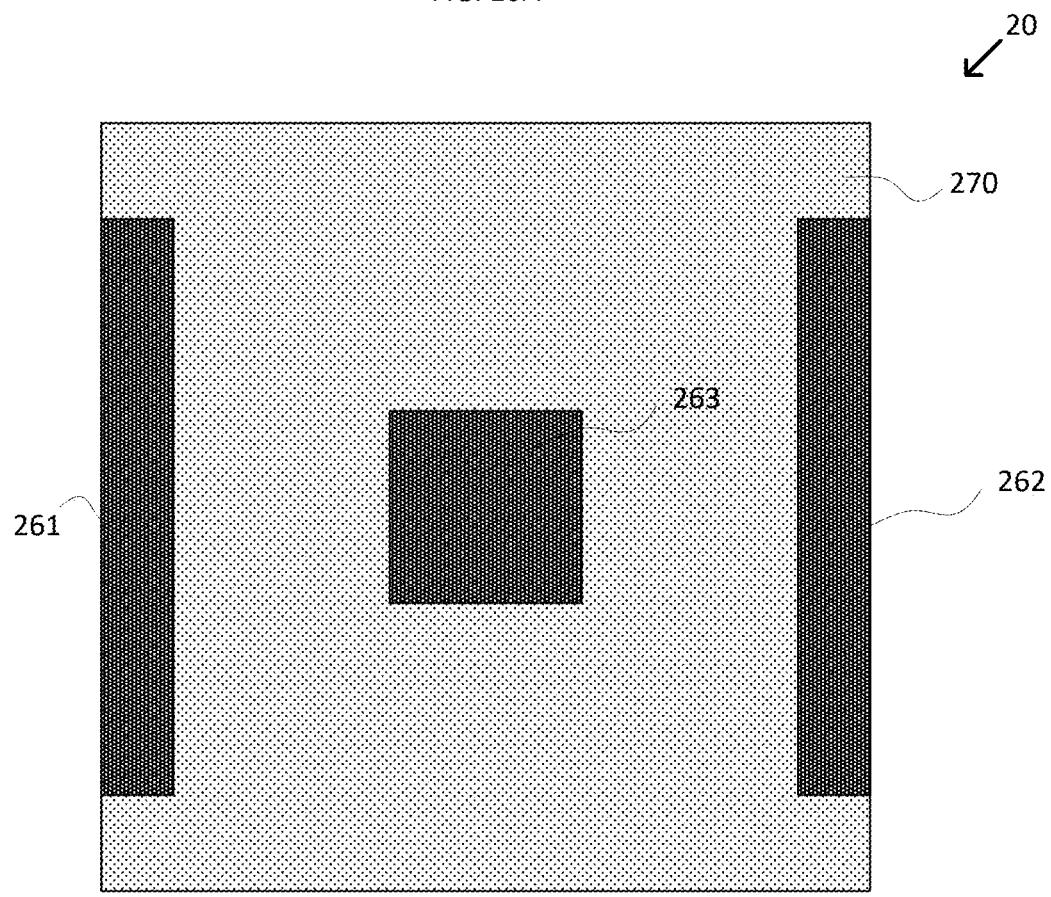

FIGS. 10A and 10B are demonstrative illustrations of a cross-sectional view (A) and a top view (B) of a MTJ structure in a step of manufacturing thereof, following the step illustrated in FIGS. 9A and 9B, according to one embodiment of present invention. More particularly, embodiments of present invention provide depositing a dielectric layer 270 to encapsulate the MTJ structure 20 under manufacturing. For example, the dielectric layer 270 may cover exposed top surfaces of the reference layer 251, the free layer 231, and the spin-orbit coupling layer 220, and may cover sidewalls or side surfaces of the reference layer 251, the tunnel barrier layer 241, and the free layer 231. The dielectric layer 270 may then be planarized through a CMP process.

Embodiments of present invention further provide forming a first electrode 261 through the dielectric layer 270 to be in contact with the first end of the free layer 231 or respective first ends of the sub free layers 2311, 2312, 2313, 2314, 2315, and 2316; forming a second electrode 262 through the dielectric layer 270 to be in contact with the second end of the free layer 231 or respective second ends of the sub free layers 2311, 2312, 2313, 2314, 2315, and 2316; and forming a third electrode 263 through the dielectric layer 270, and between the first and second electrodes 261 and 262, to be in contact with the reference layer 251. In one embodiment, the third electrode 263 may be made at a substantially central portion of the reference layer 251. The first, second, and third electrodes 261, 262, and 263 may be made of, for example, tantalum-nitride (TaN), titanium-nitride (TiN), copper (Cu), tungsten (W), or other suitable conductive materials and may be made through, for example, an ALD, a CVD, or a PVD process.

Figure 11:
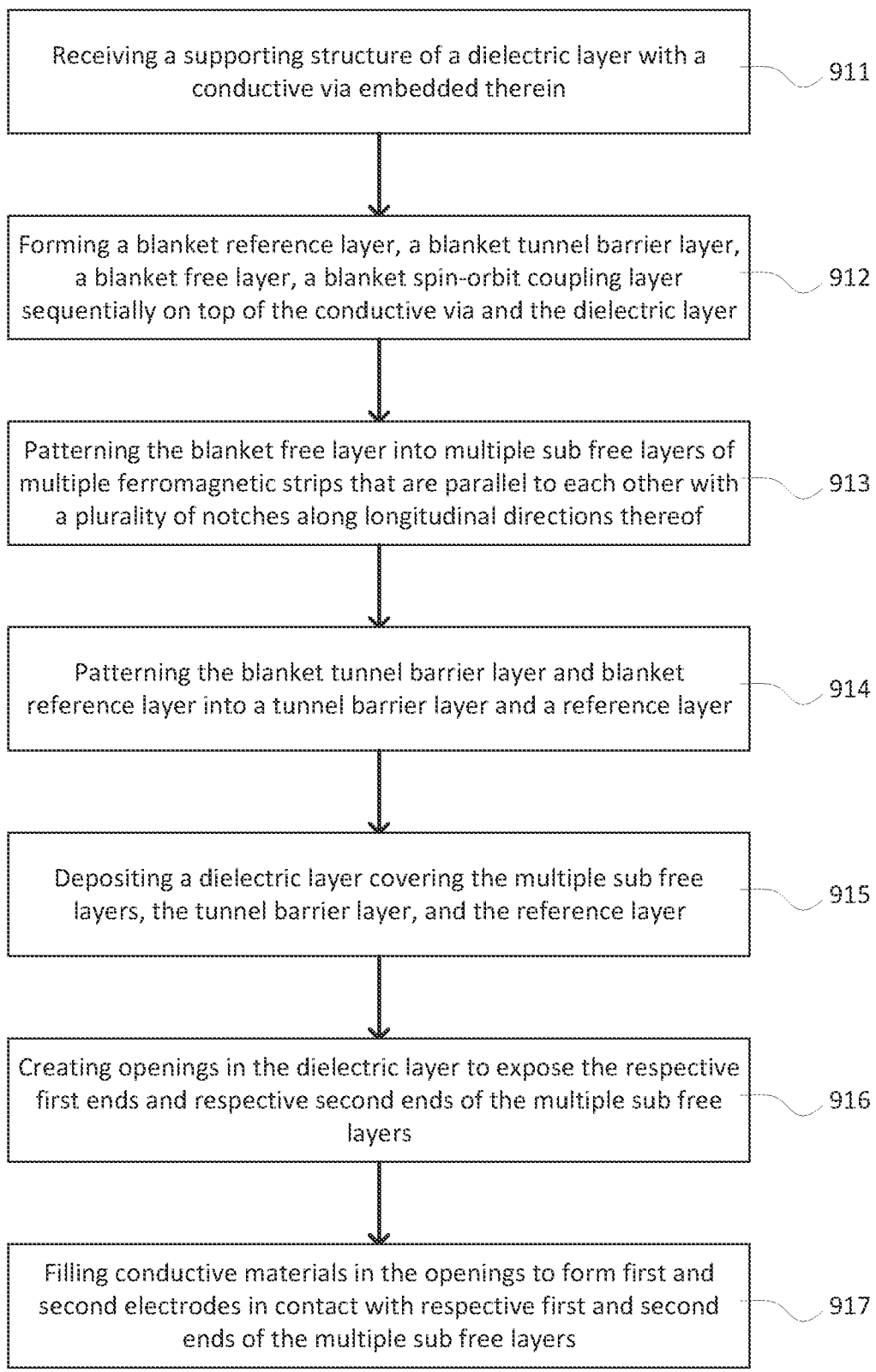
FIG. 11 is a demonstrative illustration of a flow-chart of a method of manufacturing a MTJ structure according to one embodiment of present invention.

FIG. 11 is a demonstrative illustration of a flow-chart of a method of manufacturing a MTJ structure according to one embodiment of present invention. The method includes (911) receiving a supporting structure such as a dielectric layer with a conductive via or a third electrode embedded therein; (912) forming a blanket reference layer, a blanket tunnel barrier layer, a blanket free layer, and a blanket spin-orbit coupling layer sequentially on top of the dielectric layer and the conductive via; (913) patterning the blanket free layer into multiple sub free layers of multiple ferromagnetic strips placed parallel to each other and patterning the blanket spin-orbit coupling layer into a spin-orbit coupling layer of multiple spin-orbit coupling strips on top of the multiple sub free layers, wherein the multiple ferromagnetic strips may have a plurality of notches formed along longitudinal directions thereof; (914) patterning the blanket tunnel barrier layer and the blanket reference layer into a tunnel barrier layer and a reference layer; (915) depositing a dielectric layer covering the multiple sub free layers, the tunnel barrier layer, and the reference layer; (916) creating openings in the dielectric layer to expose the respective first ends and respective second ends of the multiple sub free layers; and (917) filling conductive materials in the openings to form first and second electrodes in contact with the respective first and second ends of the multiple sub free layers.

Figure 12:
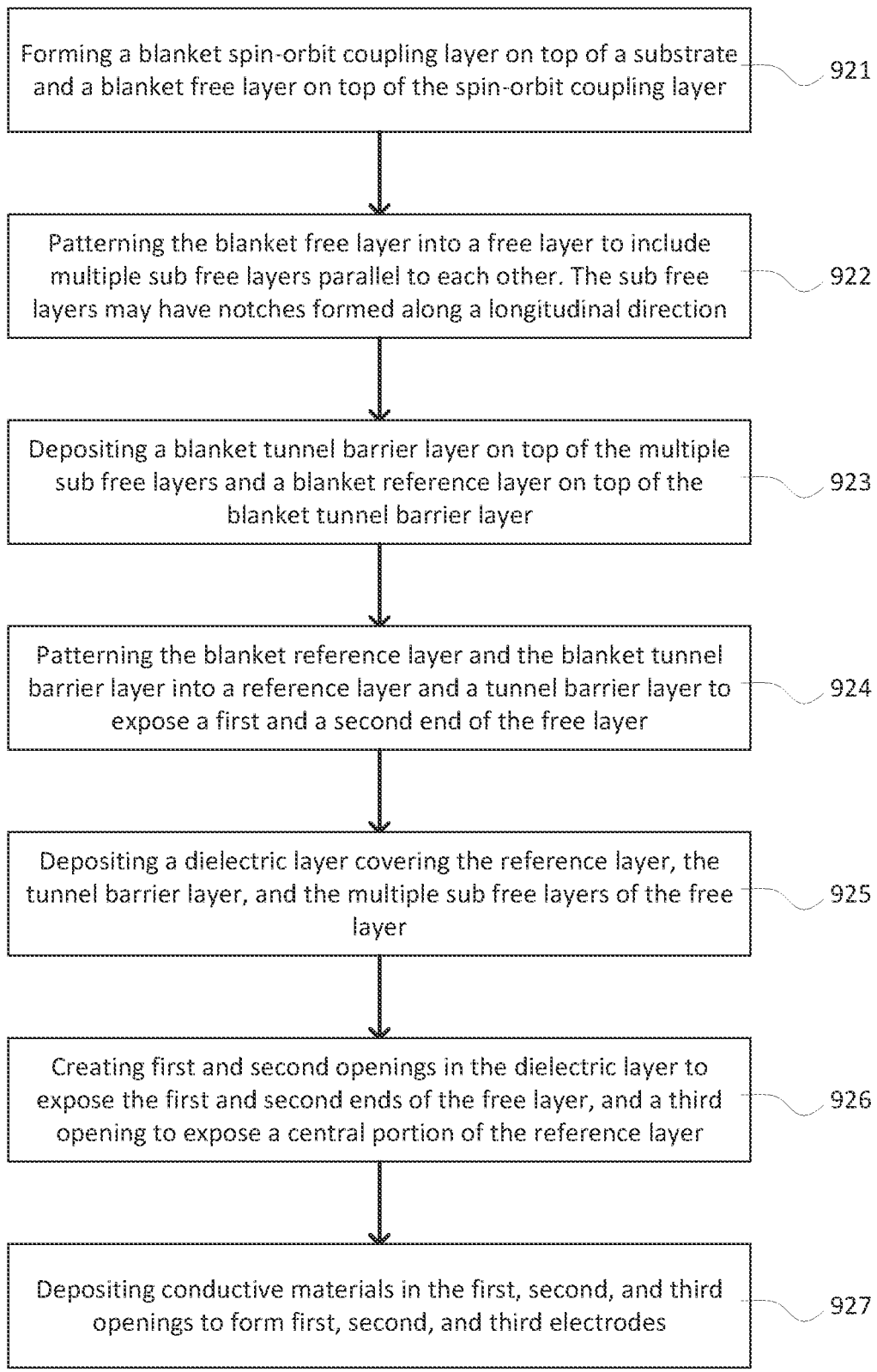
FIG. 12 is a demonstrative illustration of a flow-chart of a method of manufacturing a MTJ structure according to another embodiment of present invention.

FIG. 12 is a demonstrative illustration of a flow-chart of a method of manufacturing a MTJ structure according to one embodiment of present invention. The method includes (921) forming a blanket spin-orbit coupling layer on top of a substrate and a blanket free layer on top of the blanket spin-orbit coupling layer; (922) patterning the blanket free layer into a free layer with the free layer including multiple sub free layers that are placed or patterned to be parallel to each other. The sub free layers may have a plurality of notches formed along a longitudinal directions thereof; (923) depositing a blanket tunnel barrier layer on top of the multiple sub free layers and depositing a blanket reference layer on top of the blanket tunnel barrier layer; (924) patterning the blanket reference layer and the blanket tunnel barrier layer into a reference layer and a tunnel barrier layer to expose first and second ends of the free layer or respective first and second ends of the multiple sub free layers; (925) depositing a dielectric layer to cover the reference layer, the tunnel barrier layer, and the multiple sub free layers; (926) creating first and second openings in the dielectric layer to expose the first and second ends of the free layer and creating a third opening in the dielectric layer between the first and second openings to expose a substantially central portion of the reference layer; and (927) depositing conductive materials in the first, second, and third openings to form a first, a second, and a third electrode of the MTJ structure.

Figure 13:
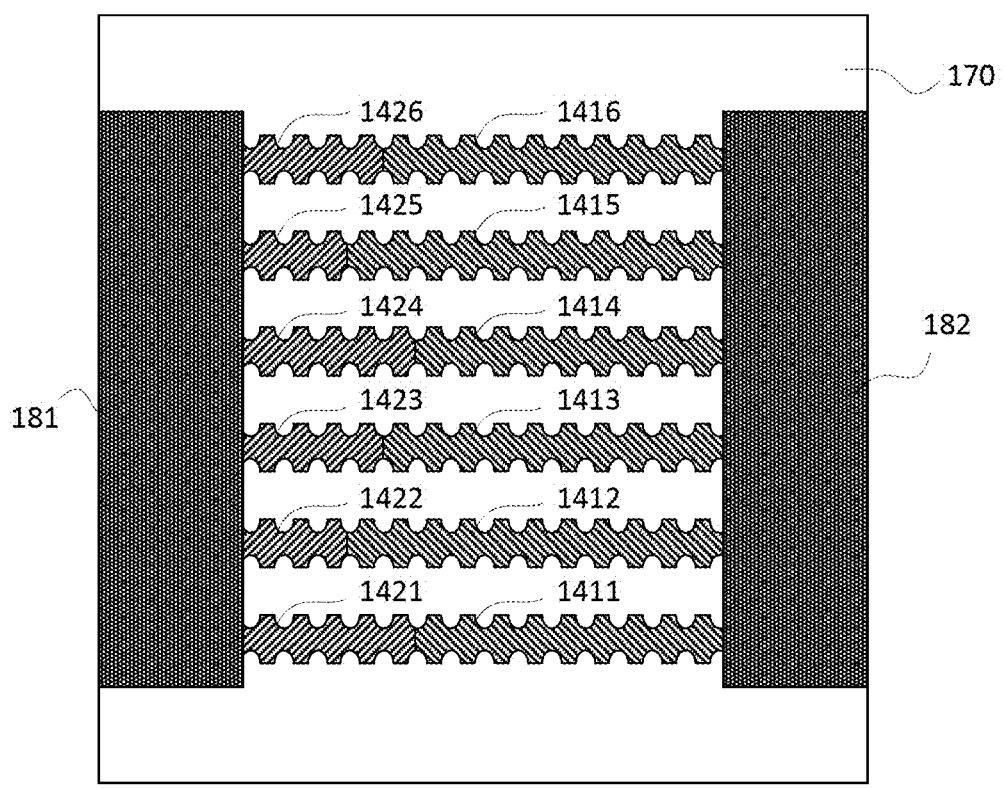
FIG. 13 is a demonstrative illustration of operation of a MTJ structure according to one embodiment of present invention.

FIG. 13 is a demonstrative illustration of operation of a MTJ structure according to one embodiment of present invention. As an example, for the purpose of explaining how the use of multiple sub free layers of ferromagnetic strips may help reduce the statistical variation of the domain-wall location of the free layer in the MTJ structure, FIG. 13 illustrates, at the free layer 141 level, a top view of programed conditions of the multiple sub free layers 1411, 1412, 1413, 1414, 1415, and 1416 during operation of the MTJ structure 10. Generally, the magnetic direction of a portion of a sub free layer may be changed by applying a magnetic field or a programing voltage. For example, a programming voltage, such as a voltage pulse, may be applied between the first electrode 181 and the second electrode 182 for a certain duration. The applied voltage may result in a domain-wall at a location in the sub free layer between a first portion whose magnetic direction (or polarization) has been changed and a second portion whose magnetic direction (or polarization) remains unchanged.

For example, for the example illustrated in FIG. 13, magnetic directions (or polarizations) of a first portion 1421 of the sub free layer 1411 (i.e., the first 5 notches), a first portion 1422 of the sub free layer 1412 (i.e., the first 3 notches), a first portion 1423 of the sub free layer 1413 (i.e., the first 4 notches), a first portion 1424 of the sub free layer 1414 (i.e., the first 5 notches), a first portion 1425 of the sub free layer 1415 (i.e., the first 3 notches), and a first portion 1426 of the sub free layer 1416 (i.e., the first 4 notches) are changed under the applied programing voltage or voltage pulse. In other words, domain-wall locations of the sub free layers 1411, 1412, 1413, 1414, 1415, and 1416 are at the fifth notch (1421), the third notch (1422), the fourth notch (1423), the fifth notch (1424), the third notch (1425), and the fourth notch (1426) respectively of the sub free layers 1411, 1412, 1413, 1414, 1415, and 1416.

Assuming, to all the sub free layers, that a domain-wall location of a programed sub free layer corresponds to a conductance value of G, and this domain-wall location may vary statistically causing the conductance value of G to have a standard deviation of S1. An effective or combined domain-wall location of the free layer 141 may correspond to a conductance value of G*N and this conductance value of G*N may have a standard deviation S2 that equals to S1*sqrt(N), with N being the total number of the sub free layers, i.e., a count of the multiple sub free layers. In other words, if the free layer 141 (that has N sub free layers) were to have a conductance value as that of a sub free layer, such as G, this conductance value of the free layer 141 may have a standard deviation that is smaller than S1 of a single sub free layer by a factor of sqrt(N), i.e., S1/sqrt(N). Moreover, the larger the number of sub free layers there is, the smaller the standard deviation of the free layer 141. In addition, the use of multiple sub free layers allows for the programming of partial conductance/resistance state that otherwise a single free layer may not have access too. For example, assuming a single free layer has access to 4 conductance/resistance states, using multiple sub free layers will provide many more discrete conductance/resistance states due to averaging over slightly different positioning of the domain-walls of each sub free layers.

It is to be understood that the exemplary methods discussed herein may be readily incorporated with other semiconductor processing flows, semiconductor devices, and integrated circuits with various analog and digital circuitry or mixed-signal circuitry. In particular, integrated circuit dies can be fabricated with various devices such as field-effect transistors, bipolar transistors, metal-oxide-semiconductor transistors, diodes, capacitors, inductors, etc. An integrated circuit in accordance with the present invention can be employed in applications, hardware, and/or electronic systems. Suitable hardware and systems for implementing the invention may include, but are not limited to, personal computers, communication networks, electronic commerce systems, portable communications devices (e.g., cell phones), solid-state media storage devices, functional circuitry, etc. Systems and hardware incorporating such integrated circuits are considered part of the embodiments described herein. Given the teachings of the invention provided herein, one of ordinary skill in the art will be able to contemplate other implementations and applications of the techniques of the invention.

Accordingly, at least portions of one or more of the semiconductor structures described herein may be implemented in integrated circuits. The resulting integrated circuit chips may be distributed by the fabricator in raw wafer form (that is, as a single wafer that has multiple unpackaged chips), as a bare die, or in a packaged form. In the latter case the chip may be mounted in a single chip package (such as a plastic carrier, with leads that are affixed to a motherboard or other high-level carrier) or in a multichip package (such as a ceramic carrier that has surface interconnections and/or buried interconnections). In any case the chip may then be integrated with other chips, discrete circuit elements, and/or other signal processing devices as part of either an intermediate product, such as a motherboard, or an end product. The end product may be any product that includes integrated circuit chips, ranging from toys and other low-end applications to advanced computer products having a display, a keyboard or other input device, and a central processor.

The descriptions of various embodiments of present invention have been presented for the purposes of illustration and they are not intended to be exhaustive and present invention are not limited to the embodiments disclosed. The terminology used herein was chosen to best explain the principles of the embodiments, practical application or technical improvement over technologies found in the marketplace, and to enable others of ordinary skill in the art to understand the embodiments disclosed herein. Many modifications, substitutions, changes, and equivalents will now occur to those of ordinary skill in the art. Such changes, modification, and/or alternative embodiments may be made without departing from the spirit of present invention and are hereby all contemplated and considered within the scope of present invention. It is, therefore, to be understood that the appended claims are intended to cover all such modifications and changes as fall within the spirit of the invention.

What is claimed is:

1. A magnetic tunnel junction (MTJ) structure comprising:
   a MTJ stack, the MTJ stack comprising a tunnel barrier layer on a reference layer and a free layer on the tunnel barrier layer,
   wherein the free layer comprises multiple sub free layers, the multiple sub free layers being multiple ferromagnetic strips placed parallel to each other on the tunnel barrier layer, the multiple ferromagnetic strips having respective first ends connected to a first electrode and respective second ends connected to a second electrode.

2. The MTJ structure of claim 1, wherein the multiple ferromagnetic strips are patterned to have notches formed along respective longitudinal directions of the multiple ferromagnetic strips.

3. The MTJ structure of claim 2, wherein the notches of the multiple ferromagnetic strips are aligned substantially with each other along the respective longitudinal directions.

4. The MTJ structure of claim 1, wherein each of the multiple ferromagnetic strips is covered by a spin-orbit coupling layer, the spin-orbit coupling layer being patterned to have a same shape as that of the each of the multiple ferromagnetic strips covered thereby.

5. The MTJ structure of claim 1, wherein the reference layer is a ferromagnetic layer vertically overlapping with the multiple sub free layers via the tunnel barrier layer.

6. The MTJ structure of claim 1, further comprising a third electrode, the third electrode being in contact with the reference layer at a substantial central position thereof.

7. The MTJ structure of claim 1, wherein the multiple sub free layers have respective domain-wall locations, defined by an applied voltage, with each domain-wall location corresponding to a conductance value of G with a standard deviation of S1, and the free layer has an effective domain-wall location, defined by the applied voltage, corresponding to a conductance value of G*N with a standard deviation of S1*sqrt (N), wherein N is a count of the multiple sub free layers.

8. A method of forming a MTJ structure, the method comprising:
   forming a blanket tunnel barrier layer on top of a blanket reference layer;
   forming a blanket free layer on top of the blanket tunnel barrier layer;
   patterning the blanket free layer into a free layer that has multiple sub free layers, the multiple sub free layers being multiple ferromagnetic strips placed parallel to each other on top of the blanket tunnel barrier layer; and
   forming a first electrode in contact with respective first ends of the multiple ferromagnetic strips and a second electrode in contact with respective second ends of the multiple ferromagnetic strips.

9. The method of claim 8, wherein patterning the blanket free layer comprises forming the multiple ferromagnetic strips with notches along respective longitudinal directions of the multiple ferromagnetic strips.

10. The method of claim 9, wherein the notches of the multiple ferromagnetic strips are substantially aligned with each other along the respective longitudinal directions.

11. The method of claim 8, further comprising forming a blanket spin-orbit coupling layer on top of the blanket free layer, wherein patterning the blanket free layer further comprises patterning the blanket spin-orbit coupling layer into multiple spin-orbit coupling strips on top of the multiple ferromagnetic strips.

12. The method of claim 8, further comprising, after patterning the blanket free layer, patterning the blanket tunnel barrier layer and the blanket reference layer into a tunnel barrier layer and a reference layer respectively.

13. The method of claim 12, further comprising depositing a dielectric layer to cover the multiple sub free layers, the tunnel barrier layer, and the reference layer.

14. The method of claim 8, further comprising forming the blanket reference layer on top of a conductive via, the conductive via being embedded in a dielectric layer and serving as a third electrode to the MTJ structure.

15. A magnetic tunnel junction (MTJ) structure comprising:
  a MTJ stack, the MTJ stack comprising a tunnel barrier layer on top of a reference layer and a free layer on top of the tunnel barrier layer,
    wherein the free layer comprises multiple sub free layers, each of which directly on top of the tunnel barrier layer and horizontally arranged to be parallel to each other, the multiple sub free layers having respective first ends in contact with a first electrode and respective second ends in contact with a second electrode.

16. The MTJ structure of claim 15, wherein the multiple sub free layers are multiple ferromagnetic strips with each of which being patterned to have notches formed along a longitudinal direction thereof.

17. The MTJ structure of claim 16, wherein the notches of the multiple ferromagnetic strips are aligned substantially with each other along their respective longitudinal directions.

18. The MTJ structure of claim 15, wherein each of the multiple sub free layers is covered by a spin-orbit coupling layer, the spin-orbit coupling layer being patterned to have a same shape as that of a sub free layer covered thereby.

19. The MTJ structure of claim 15, wherein the reference layer is a ferromagnetic layer vertically overlapping with the multiple sub free layers via the tunnel barrier layer.

20. The MTJ structure of claim 15, further comprising a third electrode, the third electrode being in contact with the reference layer at a substantial central position thereof.

* * * * *